D. LOCKE.
Potato Digger.

No. 95,242. Patented Sept. 28, 1869.

Witnesses:
H. S. Sprague.
Jas. J. Days

Inventor
Daniel Locke
per Attorney
Thos. S. Sprague

United States Patent Office.

DANIEL LOCKE, OF GENEVA, WISCONSIN.

Letters Patent No. 95,242, dated September 28, 1869.

IMPROVEMENT IN POTATO-DIGGERS.

The Schedule referred to in these Letters Patent and making part of the same.

*To whom it may concern:*

Be it known that I, DANIEL LOCKE, of Geneva, in the county of Walworth, and State of Wisconsin, have invented a new and useful Improvement in Potato-Excavators; and I do hereby declare that the following is a true and accurate description thereof, reference being had to the accompanying drawings, and to the letters of reference marked thereon, and being a part of this specification.

Figure 1:
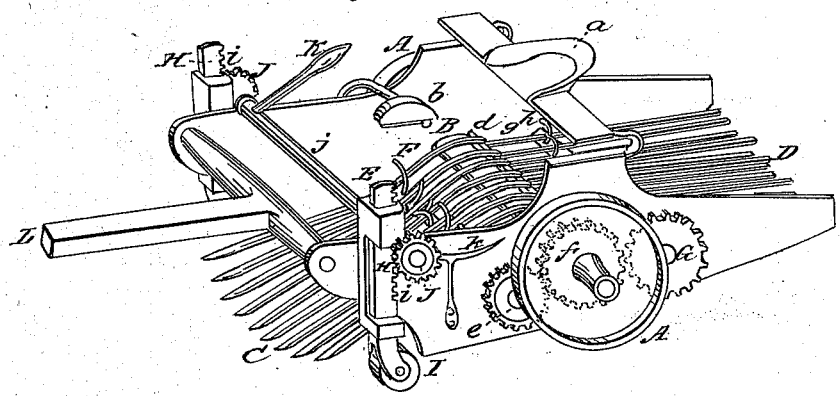

Figure 1 is a perspective view, and

Figure 2:
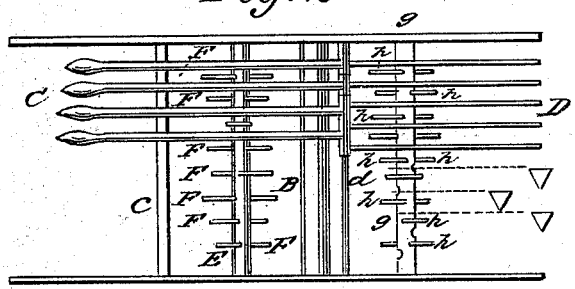

Figure 2, a side elevation, with frame broken out to show the peculiar shape and operation of the vibrating grate.

Like letters refer to like parts in each figure.

The nature of this invention relates to an improved construction in a triangular revolving shaft, provided with notches upon its corners, spirally arranged, and with curved teeth, spirally arranged, which teeth project through and operate between the slats of a suitable grate, the office of the notches being to cause the grate to vibrate and clear itself from earth, and the curved teeth serving to strip the vines from the potatoes passing over the grate.

It also consists in the combination and arrangement of its other several parts, the principal of which are a scoop, composed of pointed slats, which enters the ground beneath the potatoes, and lifts them; a rotating shaft, with curved teeth, spirally arranged thereon, and operating between the slats of the scoop, for the purpose of dislodging the earth, and stripping the vines from the potatoes; and certain devices for raising and lowering the front of the scoop.

In the drawings—

A represents the wheels, hung and rotating upon the axle B, the frame being provided with a seat, $a$, for the driver, and a foot-rest, $b$.

C are a series of pointed slats, of any convenient shape, their rear ends being rigidly secured to the axle B, while the transverse bar $c$ is secured to their under sides, and holds them in their relative positions, the whole forming a scoop to pass under the hill in the forward motion of the machine.

D are a series of rods, their forward ends pivoted to or sleeved upon a stationary shaft, $d$, the ends of which are secured to the frame.

These rods are entirely independent of each other in their action, and must be so pivoted or sleeved that they will retain their relative position to each other, as shown in the drawings.

A vertically vibrating motion is given to these rods, as hereinafter described.

E is a rotating shaft, the ends of which are journalled into the sides of the frame, in such a manner that upon said shaft, and outside the frame, the cogged wheel $e$ may be secured, by means of which motion is communicated to said shaft.

To this shaft are secured the curved teeth F, which project upward through the interstices between the slats C of the scoop.

These teeth are not set upon a line, so that they all operate between the slats at the same time, but are so arranged that in each rotation of the shaft, some of them are always presented through the interstices between the slats.

A cogged wheel, $f$, shown in red lines in fig. 1, is secured to the inner face of the traction-wheel, and engages with the wheel $e$, to which, and the shaft E, it gives motion.

It also engages with and gives motion to cogged-wheel G, which is rigidly secured to the rotating shaft $g$, which is provided with curved teeth $h$, similar in form and arrangement to those described as being secured to the shaft E.

It will be noticed that the curved teeth F and $h$ are so arranged that in their rotation their points are not first presented through the interstices, for the reason that said points would be apt to cut the potatoes.

The curved parts of said teeth are, therefore, first presented through the spaces.

The shaft $g$, in the drawings, is triangular in form, with notches cut in its corners, so that in its rotation, it will act as a series of cams or eccentrics, by means of which a vertically-vibrating motion is given to the rods D, the object being not to have all of said rods rise and fall at the same time, but only alternately, or in other words, that a part of them will rise while the other part drop, thereby securing a more perfect separation of the earth from the potatoes.

H are vertically sliding standards, properly secured to or near the front ends of the frame.

To the bottom ends of these standards are secured the caster-wheels I.

The standards are provided with a toothed rack, $i$, which engages with the cogged pinions J, which are rigidly secured to each end of the shaft $j$, which semi-rotates in suitable bearings in the frame, and is operated by the hand-lever K, which should be placed within easy reach of the driver.

A spring-dog, $k$, operated, when desired, by the foot of the driver, engages with one of the pinions, J, and holds the shaft $j$ in any desired position.

L is a pole, by means of which the team is attached to the apparatus.

If desired, suitable knives may be secured to the front wings of the frame, to cut weeds or potato-tops, and prevent them from clogging the machine.

By the arrangement of the standards H and their attachments, the caster-wheels may be elevated, when desired to turn the machine around, or to gauge the depth to which it is desired to have the scoop operate.

By dropping the standards, the scoop may be lifted entirely from the ground, so that the machine can be transported easily from place to place.

The operation of the other parts of the apparatus having been so fully set forth, a further description is deemed unnecessary.

What I claim as my invention, and desire to secure by Letters Patent, is—

The triangular shaft $g$, provided with notches upon its corners, spirally arranged, and with curved teeth $h$, spirally arranged thereon, in connection with the rods D, sleeved or pivoted to the stationary shaft $d$, when constructed, arranged, and operating as above shown and described.

Also, in combination with the above, the slotted scoop, composed of the pointed slats C, secured to the axle B, and the transverse bars $c$, as herein specified.

Also the combination of the rotating shaft E, provided with curved teeth F, spirally arranged thereon, in connection with the scoop C, with the triangular shaft $g$, provided with notches and teeth, as above described, and with the grate D, and the cog-wheels $e, f,$ and G, when constructed, arranged, and operating as above set forth.

Also, in combination with the scoop C, the arrangement of the sliding standard H, provided with caster-wheels I, tooth-rack $i$, cogged pinion J, shaft $j$, hand-lever K, and spring-dog $k$, when constructed and operating as above mentioned.

Also, the arrangement of the wheels A, the axle B, the scoop C, the rods D, the shafts E and $g$, the cogged wheels $e, f,$ and G, the standards H, the caster-wheels I, rack $i$, cogged pinions J, shaft $j$, hand-lever K, and dog $k$, when constructed and operating as and for the purposes herein set forth, shown, and described.

DANIEL LOCKE.

Witnesses:
GEO. O. MANCHESTER,
M. VAN ALLEN.